US006353594B1

(12) United States Patent
Tooker et al.

(10) Patent No.: US 6,353,594 B1
(45) Date of Patent: Mar. 5, 2002

(54) SEMI-PERMANENT VIRTUAL PATHS FOR CARRYING VIRTUAL CHANNELS

(75) Inventors: Mark Tooker; Tom Phillips, both of Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/034,398

(22) Filed: Mar. 4, 1998

(51) Int. Cl.[7] ............................................. H04L 12/26
(52) U.S. Cl. ...................................... 370/218; 370/522
(58) Field of Search ............................... 370/397, 398, 370/409, 395, 465, 216, 228, 218, 241, 242, 244, 522

(56) References Cited

U.S. PATENT DOCUMENTS 6,041,037 A * 3/2000 Nishio et al. ............... 370/228
6,094,431 A * 7/2000 Yamato et al. ............. 370/395

* cited by examiner

Primary Examiner—Melvin Marcelo
Assistant Examiner—Alexander O. Boakye
(74) Attorney, Agent, or Firm—Marks & Clerk

(57) ABSTRACT

A semi-permanent virtual path circuit (SPVPC) is used in a dedicated-connection switching digital network for routing and maintaining data flow between network edge nodes. A two level connection admission control and signaling regime is employed wherein the semi-permanent virtual path circuit is automatically provisioned by a network management system to level two signaling and connection admission control and the physical link between pairs of core nodes is provisioned with level one resources. Under this scheme the physical link between core nodes is limited to virtual path circuits and the SPVPC carries switched virtual channel circuits (SVCCs) and semi-permanent virtual channel circuits (SPVCCs). The level two resources are configured to react slower to network changes, such as network failure, than the level one resources. In the event of network failure the faster acting level one signaling resources attempt to re-route VPC connections between core nodes before the slower level two resources becomes aware of the failure.

18 Claims, 2 Drawing Sheets

SEMI-PERMANENT VIRTUAL PATHS FOR CARRYING VIRTUAL CHANNELS

FIELD OF THE INVENTION

This invention relates to dedicated-connection switching technology used in digital communications networks and more particularly to switching technologies employing virtual channel and virtual path circuits, such as asynchronous transfer mode (ATM).

BACKGROUND

Dedicated-connection switching technologies such as asynchronous transfer mode (ATM) utilize virtual channel circuits (VCC) to transfer packets of data through and between switching nodes. Traffic management is simplified by aggregating VCC traffic onto virtual path circuits (VPC) in instances where circuits share a common route over one or more switching nodes.

It is also known that within a network, a permanent virtual path circuit (PVPC) can be utilized as a kind of virtual link onto which a plurality of VCCs can be bundled. In the event of a network failure a PVPC can be rerouted around the network failure more efficiently than a plurality of unbundled VCCs, since fewer circuits must be removed and re-established elsewhere. The shortcoming of this approach is that the exact route taken through the network by the PVPC must be centrally planned and provisioned. In the event of a network failure the central planning and provisioning authority must ensure that a new route for the PVPC is reestablished as quickly as possible. The use of a central authority for routing and rerouting the PVPC, even when automated, incurs a cost of efficiency, chiefly due to: 1) the cost of implementing and maintaining the centralized authority; 2) the cost of network management bandwidth incurred in issuing provisioning commands from the central authority to the network elements; and 3) the real time performance penalty incurred when rerouting around trouble spots, from passing information on network conditions up to the central authority, then passing routing and rerouting commands down to each network element traversed by the PVPC.

The present invention significantly reduces this efficiency cost by replacing the PVPC with a semi-permanent virtual path circuit (SPVPC), and using two different levels of connection admission control and signaling means to permit switched virtual channel circuits (SVCC) and semi-permanent virtual channel circuits (SPVCC) to utilize the SPVPC.

SUMMARY OF THE INVENTION

It is the object of the present invention to provide for the automatic provisioning and use of semi-permanent virtual path circuits for carrying virtual channels.

In accordance with a preferred embodiment of the invention each pair of nodes in the core of the network which are joined by a physical link may be configured by a network management system such that the ends of the physical link are configured with level one (or a first) connection admission control means, which permits only virtual path circuits (VPC) to utilize the physical link directly, and level one (or a first) signaling means, which attempts to remove and re-establish elsewhere the VPCs directly utilizing the physical link as soon as possible after a failure of the physical link is detected. The network management system may connect each pair of nodes at the edge of the network with a semi-permanent virtual path circuit (SPVPC). Each SPVPC thus established has level two (or a second) connection admission control means configured at each endpoint, which permits switched virtual channel circuits (SVCC) and semi-permanent virtual channel circuits (SPVCC) to utilize the SPVPC, and level two (or a second) signaling means, which in the event of a failure in the core of the network reacts more slowly than the level one signaling means, in that it attempts to remove and re-establish elsewhere the individual SVCCs and SPVCCs using the SPVPC only if the SPVPC cannot be immediately rerouted around the failure using the level one signaling and connection admission control means that exist in the core of the network.

Therefore, in accordance with a first broad aspect of the invention there is provided in a digital network having switching means to transfer packets of data between network edge nodes through a plurality of physically linked intermediate core nodes, a semi-permanent virtual path circuit (SPVPC) for routing and maintaining packet flow through the core nodes on virtual channel connections, the physical link between core nodes and the SPVPC being provisioned by a network management systems using level one and level two connection admission control and signaling respectively.

In accordance with a second aspect of the invention there is provided a method of routing and maintaining flow of data traffic between respective network edge nodes by way of intermediate core nodes in a dedicated-connection switching digital communications network, comprising: establishing a semi-permanent virtual path circuit (SPVPC) between respective edge nodes in the network for carrying virtual channel connections; identifying physical links between pairs of intermediate core nodes; provisioning the physical link to level one connection admission control and signaling whereby the physical link permits only virtual path circuit traffic and seeks alternate routing for VPCs in the event of a network failure; provisioning the SPVPC to use level two connection admission control and signaling whereby the SPVPC carries switched virtual channel circuits SVCCs and semi-permanent virtual channel circuits SPVCCs and seeks alternate routes for SVCCs and SPVCCs in the event of network failure; and configuring the level two connection admission control and signaling to respond more slowly than the level one connection admission control and signaling, whereby in the event of a network failure re-routing is set up on the SPVPC only if re-routing is not established via the physical links within a certain time.

BRIEF DESCRIPTION OF THE DRAWINGS

The invention will now be described in greater detail with reference to the attached drawings wherein.

DETAILED DESCRIPTION OF THE INVENTION

Figure 1:
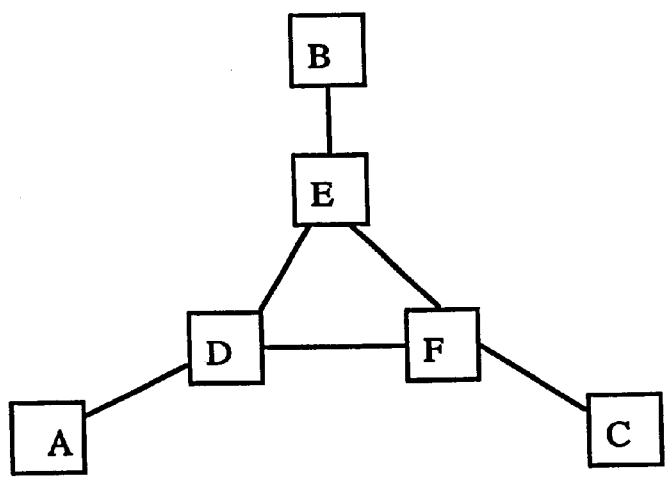
FIG. 1 illustrates the physical network topology according to the present invention.

In the present invention each pair of nodes at the edge of a digital network has switching means to transfer packets of data between respective network edge nodes through a plurality of intermediate core nodes. A semi-permanent virtual path circuit (SPVPC) is provided for routing and maintaining packet flow through the core nodes on virtual channel circuits originating at the edges of the network. Each SPVPC thus established is preferably requested by a network management system but routed and maintained by the network switching nodes themselves. Each pair of core nodes in the network is joined by a physical link. A network management system may provide or configure the respective nodes at each endpoint of the physical link with a level one connection admission control (CAC) means and a level one signaling means. The level one connection admission control means permits the establishment of virtual circuits on the physical link such that virtual path circuits (VPC) are permitted but virtual channel circuits (VCC) are not permitted unless the virtual channel circuit is contained within a virtual path circuit. The level one signaling means controls the provisioning and maintenance of virtual circuits such that it attempts to remove and reroute the SPVPC from a physical link as soon as possible after detecting that the physical link or the node at the opposite end of the physical link has failed.

Each of the semi-permanent virtual path circuits established between edge nodes according to the previously described aspect is provisioned by the network management system to have level two connection admission control means and level two signaling means at its endpoints. The level two connection admission control means permits the establishment of virtual circuits on the physical link such that virtual channel circuits (VCC) are permitted to be established only if they are carried by a semi-permanent virtual path circuit which has an endpoint on that node. The level two signaling means controls the provisioning and maintenance of switched virtual circuits (SVCC) and semi-permanent virtual circuits (SPVCC) such that in case of a failure of a semi-permanent virtual path circuit carrying the SVCC or SPVCC, it attempts to remove and re-establish elsewhere the SVCCs or SPVCCs only if after sufficient delay the semi-permanent virtual path circuit (SPVPC) cannot be rerouted around a failure in the core of the network through the level one connection admission control and signaling means established in accordance with the previously described aspect.

It is noted that one or more virtual path circuits may be carried over links between core nodes. Furthermore, although virtual path circuits are preferably routed over the links interconnecting core nodes, virtual channel circuits may also be carried over such links.

The advantage derived from the establishment of semi-permanent virtual path circuits (SPVPC) is that they can be rerouted around a network failure more efficiently than permanent virtual path circuits (PVPC)which typically are routed by the central network management authority. This is due to the fact that since the central planning authority is not required to assist in the routing and rerouting decision-making for semi-permanent circuits, there are savings in implementation and maintenance costs. Additionally, no communications are required between the central authority and the network elements, other than the initial provisioning of the SPVPC, thus saving cost and improving the speed of routing and rerouting. These improvements are then passed on to the virtual channels which ride the SPVPC since they do not require routing or rerouting within the part of the network traversed by the SPVPCL.

The advantage of using level one connection admission control means at the endpoints of physical links in the core of the network and level two connection admission control means at the endpoints of the semi-permanent virtual path circuits (SPVPC) at the edges of the network is that switched virtual channel circuits (SVCC) and semi-permanent virtual channel circuits (SPVCC) can traverse the core of the network only if carried by the semi-permanent virtual path circuits (SPVPC). Having a plurality of virtual channel circuits bundled onto a smaller number of virtual path circuits means that fewer circuits must be established and maintained in the core of the network. Having fewer circuits in the core of the network results in greater efficiency in the core switches, in terms of the processing time and data storage space required.

The advantage of using a fast-reacting level one signaling means at the endpoints of each physical link in the core of the network and a slower-reacting level two signaling means at the endpoints of the semi-permanent virtual path circuits (SPVPC) at the edges of the network as previously described is that in the event of a failure in the core of the network, the switches at the edge of the network do not attempt to remove and re-establish elsewhere the many SVCCs and SPVCCs which are carried by a semi-permanent virtual path circuit (SPVPC) affected by the network failure unless the SPVPC cannot itself be removed and re-established elsewhere by the core nodes. This means that fewer circuits must be removed and re-established in case of network failure in order for traffic to be rerouted around the failure, causing an increase in the efficiency of the network switches' use of processing time and decreasing the length of time during which network traffic is interrupted.

FIG. 1 shows the physical topology of a network having switching elements A, B, C, D, E and F. Each edge represents a physical cable between two adjacent elements. In the present invention a large number of switched virtual channel connections and semi-permanent virtual channel connections are supported by core elements D, E and F between edge elements A, B and C.

Figure 2:
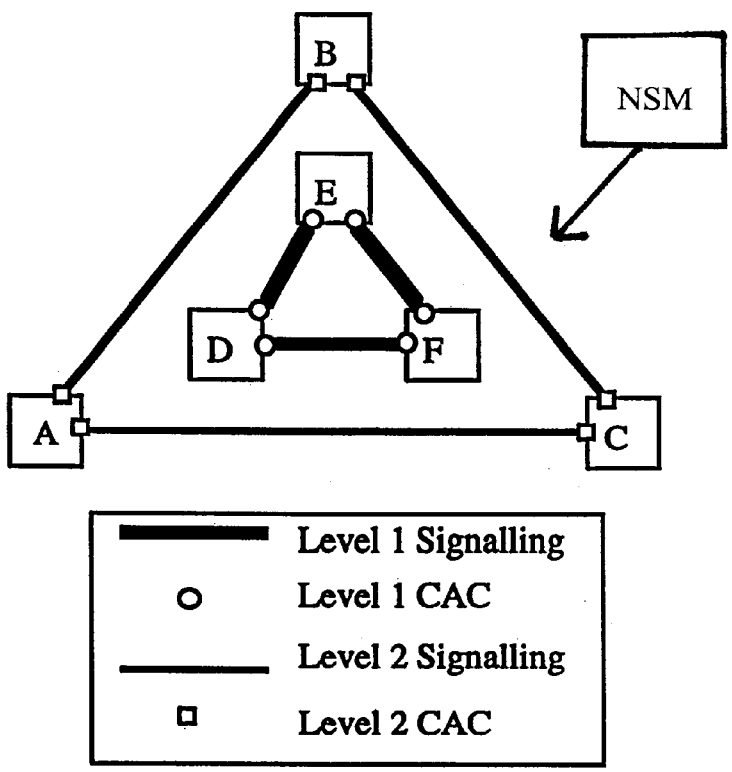
FIG. 2 illustrates the logical network topology of the embodiment of FIG. 1.

FIG. 2 illustrates a logical network topology of the physical network shown in FIG. 1. In FIG. 2 the network topology is automatically provisioned by a central network management system (not shown) such that 1) level one signaling and CAC is established between each pair of core nodes (nodes D, E, F) and 2) level two signaling and CAC is established between each pair of edge nodes (nodes A, B, C).

A semi-permanent virtual path circuit link that can carry switched virtual channels is connected between each pair of nodes A, B and C, using the level two signaling and connection admission control resources. As shown in FIG. 2, level one signaling is shown in heavy solid line between nodes D, E and F and level two signaling is shown by the thinner line between nodes A, B and C.

Figure 3:
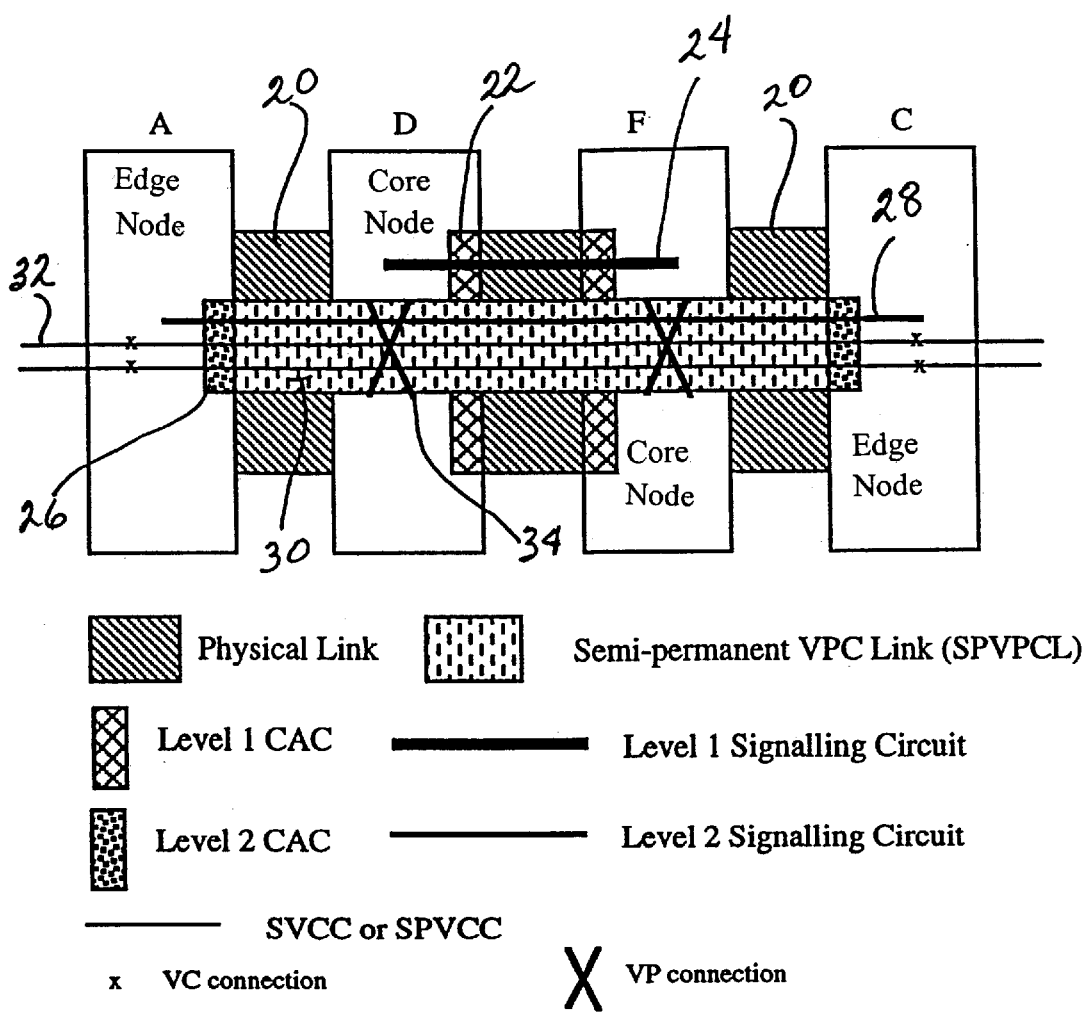
FIG. 3 illustrates inter-node connectivity according to the present invention.

FIG. 3 shows the various resources which are involved in carrying switched virtual channel connections and semi-permanent virtual channel connections between nodes A and C. As shown, nodes A and D, D and F, and F and C are joined by physical links 20. Level one connection admission control resources 22 interface with nodes D and F, and the level one signaling circuit 24 connects nodes D and F. Level two connection admission control resources 26 are supported by nodes A and C and the level two signaling 28 connects nodes A and C. The semi-permanent virtual path connection (SPVPC) is shown at 30. Virtual channel connections 32 travel through the network entering A and exiting node C. Virtual path connections are shown at 34.

In the event of a failure of any physical link in the core of the network, i.e. between nodes D, E or F, the level one signaling resources detect the failure and cause any SPVPCs using the physical link to be rerouted. This means that the virtual path connections are torn down and reestablished such that the SPVPC uses different physical links before the level two signaling resources detect that there is a network failure. Therefore, no SVCCs or SPVCCs are cleared back to the originator and subsequently torn down or rerouted as a result of the physical link failure. Overall there are fewer cross connections that have to be reestablished and there are fewer nodes involved in handling the network failure.

As indicated previously, this results in greater network efficiency, reduced cost and improved speed of routing and rerouting.

In an alternate embodiment, instead of level one CAC being configured by the network management system on the physical links between each pair of core nodes, which forbids the routing of SPVCCs and SVCCs directly over the links, the edge and core switches themselves employ routing algorithms which route SPVCCs and SVCCs over the SPVPCs in preference, but which could route SPVCCs directly over the physical links between core nodes whenever it is impossible or it is inefficient to route them over SPVCCs.

Although specific embodiments of the invention have been described and illustrated it will be apparent to one skilled in the art that numerous variations can be introduced without departing from the basic concept of the invention. It is to be understood that such variations will fall within the scope of the invention as defined by the appended claims.

GLOSSARY

ATM Asynchronous Transfer Mode: A dedicated-connection switching technology that organizes digital data into 53-byte cells or packets and transmits them over a digital medium.

PVC Permanent Virtual Circuit: An end-to-end logical circuit which is established and maintained by a central network management authority. They tend to be of longer duration than SVCs and they are automatically re-established after a system restart.

PVPC Permanent Virtual Path Circuit: A VPC which is established and maintained by a central network management authority.

SPVC Semi-Permanent Virtual Circuit: An end-to-end logical circuit for which establishment is initiated at the request of a central network management authority, but which is established and maintained by the network elements themselves via a signaling protocol. SPVCs tend to be of the same duration as PVCs, and are automatically re-established after a system restart. Also sometimes called a Soft or Smart Permanent Virtual Circuit.

SPVCC Semi-Permanent Virtual Channel Circuit: A VCC for which establishment is initiated at the request of a central network management authority, but which is established and maintained by the network elements themselves via a signaling protocol.

PVPC Semi-Permanent Virtual Path Circuit: An SPVC which can carry one or more virtual channels.

SVC Switched Virtual Circuit: An end-to-end logical circuit which is set up on demand via a signaling protocol. Such circuits tend to be of shorter duration that PVCs, and are not automatically re-established after a system restart.

SVPC Switched Virtual Path Circuit: A VPC which is set up on demand via a signaling protocol.

SVCC Switched Virtual Channel Circuit: A VCC which is set up on demand via a signaling protocol.

VC Virtual Channel: A logical communication channel that is available across a physical ATM interface. Not to be confused with Virtual Circuit, which is a generic term for Virtual Channel Circuit (VCC) or Virtual Path Circuit (VPC).

VCC Virtual Channel Circuit: A concatenation of virtual channels that extends between ATM users.

VCI Virtual Channel Identifier: A field in the ATM header that identifies virtual channels.

VP Virtual Path: A logical communication channel that is available across a physical ATM interface and that can carry one or more virtual channels.

VPC Virtual Path Circuit: A concatenation of virtual paths that extends between the point where the virtual channel identifier values are assigned and the point where those values are translated or removed.

VPI Virtual Path Identifier: A field in the ATM header that identifies virtual paths.

What is claimed is:

1. A digital network for transferring packets of data between edge nodes through intermediate core nodes, the packets flowing on virtual path circuits through the core nodes from virtual channel circuits on the edge nodes, each core node of a pair interconnected by a physical link having a first level connection admission control permitting establishment of the virtual path circuits traversing the core node onto the physical link; and each edge node having a second level connection admission control permitting establishment of the virtual channel circuits on the edge node if such are carried by a virtual path circuit which has an endpoint on that edge node.

2. A semi-permanent virtual path circuit (SPVPC) as defined in claim 1 wherein provisioning of level two admission control and signaling is applied to edge nodes at each end of said SPVPC.

3. A semi-permanent virtual path circuit (SPVPC) as defined in claim 2 wherein said level two connection admission control permits only switched virtual channel circuits (SVCC) and semi-permanent virtual channel circuits (SPVCC) on said SPVPC.

4. A semi-permanent virtual path circuit (SPVPC) as defined in claim 3 wherein, in the event of a network failure said level one signaling seeks a secondary path for routing said SPVPC through said core.

5. A semi-permanent virtual path circuit (SPVPC) as defined in claim 4 wherein, in the event of a network failure said level two signaling seeks to set up alternate route for said SVCCs and SPVCCs through said SPVPC.

6. The digital network as defined in claim 1, wherein said first level connection admission control permits virtual channel circuits only if contained within a virtual path circuit.

7. The digital network as defined in claim 6, wherein each core node includes first level signaling which controls provisioning and maintenance of virtual path circuits.

8. The digital network as defined in claim 7, wherein the first level signaling in the core node of a pair attempts to re-route the virtual path circuit upon detecting a failure in the physical link or other core node of the pair.

9. The digital network as defined in claim 8, wherein each edge node includes second level signaling which controls provisioning and maintenance of virtual channel circuits on virtual path circuits.

10. The digital network as defined in claim 9, wherein the second level signaling attempts to re-route the virtual channel circuits in the event of a failure of the virtual path circuit carrying the virtual channel circuits, only after a sufficient delay to permit said first level signaling to attempt to re-route said virtual path circuit.

11. A method of transferring data between respective edge nodes through intermediate core nodes in a digital network, the packets flowing on virtual path circuits through the core nodes from the virtual channel circuits on the edge nodes, the method comprising:

provending at each core node, of a pair of core nodes interconnected by a physical link, a first level connection admission control which permits establishment of the virtual path circuits traversing the core node onto the physical link; and providing each of said edge nodes with a second level connection admission control which permits establishment of the virtual channel circuits on the edge nodes if such are carried by a virtual path circuit which has an edge point on that edge node.

12. A method as defined in claim 11 wherein said first and second level connection admission control is effected by a network management system.

13. A system for routing data traffic via physical links connecting core nodes located between edge nodes of a digital communication network comprising:

a virtual path connection between said edge nodes for carrying data packets;

means to provide said core nodes with first level connection admission control and first level signaling; and means to provide said edge nodes with second level connection admission control and second level signaling.

14. A system as defined in claim 13 wherein a network management system provides said first level connection admission control and first level signaling and said second level connection admission control and second level signaling.

15. A system as defined in claim 14 for re-routing data traffic in the event of a failure of a physical link.

16. A system as defined in claim 15 wherein said second level connection admission control and signaling responds to a network failure more slowly than said first level of connection admission control and signaling.

17. A system as defined in claim 13 for routing and maintaining data traffic through said network.

18. A system as defined in claim 13 wherein said edge nodes and said core nodes have means to implement routing algorithms.

* * * * *

UNITED STATES PATENT AND TRADEMARK OFFICE
CERTIFICATE OF CORRECTION

PATENT NO. : 6,353,594 B1  Page 1 of 1
DATED : March 5, 2002
INVENTOR(S) : Mark Tooker et al.

It is certified that error appears in the above-identified patent and that said Letters Patent is hereby corrected as shown below:

Column 6,
Delete lines 29-45.
Line 46, change "6" to -- 2 --;
Line 49, change "7" to -- 3 -- and "6" to -- 2 --;
Line 52, change "8" to -- 4 -- and "7" to -- 3 --;
Line 56, change "9" to -- 5 -- and "8" to -- 4 --;
Line 60, change "10" to -- 6 -- and "9" to -- 5 --;
Line 66, change "11" to -- 7 --;

Column 7,
Line 14, change "12" to -- 8 -- and "11" to -- 7 --.
Line 17, change "13" to -- 9 --.

Column 8,
Line 4, change "14" to -- 10 -- and "13" to -- 9 --;
Line 10, change "15" to -- 11 -- and "14" to -- 10 --;
Line 12, change "16" to -- 12 -- and "15" to -- 11 --;
Line 17, change "17" to -- 13 -- and "13" to -- 9 --; and
Line 20, change "18" to -- 14 -- and "13" to -- 9 --.

Signed and Sealed this

First Day of June, 2004

JON W. DUDAS
*Acting Director of the United States Patent and Trademark Office*